Nov. 25, 1952 J. F. PEZDIC 2,619,200
DASH-POT
Filed April 19, 1950
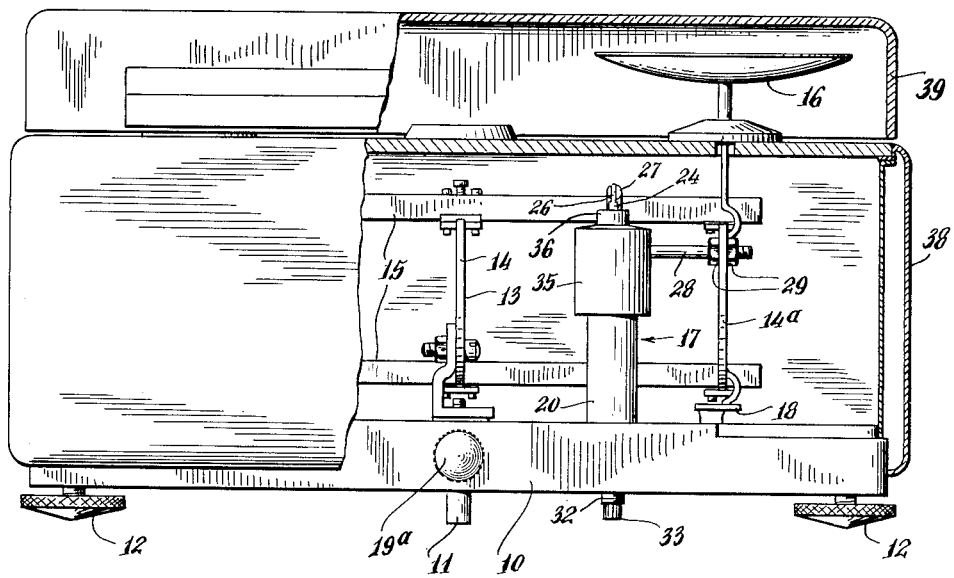
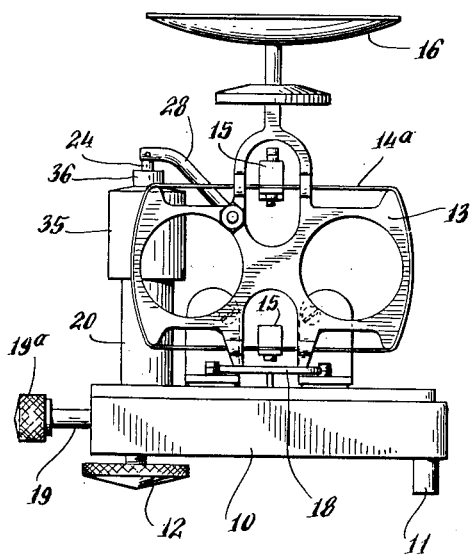
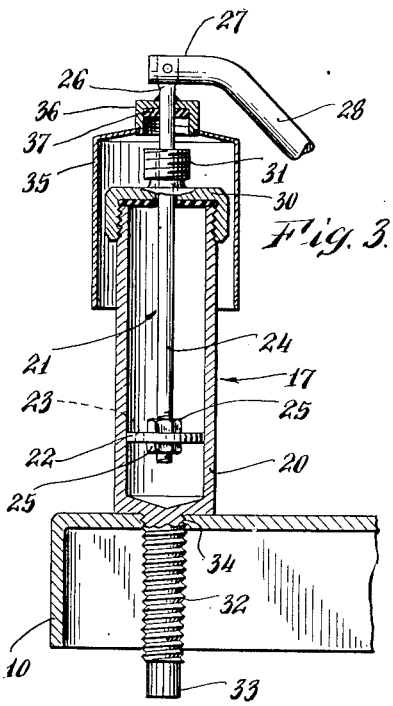
INVENTOR.
John Frank Pezdic.
BY
Fraser, Myers & Manley.
ATTORNEYS.

Patented Nov. 25, 1952

2,619,200

UNITED STATES PATENT OFFICE 2,619,200

DASH-POT

John Frank Pezdic, Saddle River Township, Bergen County, N. J., assignor to The Torsion Balance Company, Clifton, N. J., a corporation of New York Application April 19, 1950, Serial No. 156,825

1 Claim. (Cl. 188—100)

The present invention relates to a dash-pot for damping the oscillations of a scale beam of a weighing scale, balance and the like, and aims to provide certain improvements in such devices.

Dash-pots using air or hydraulic fluid have long been used in scales and balances, the hydraulically operated dash-pots being the more efficient. Accordingly, it is preferable to use dash-pots containing hydraulic fluid to those employing air in balances where it is desired to obtain rapid damping of the oscillations of the beam. The hydraulic fluid most usually used in dash-pots is oil and, to avoid spillage thereof when shipping or repairing a balance, means have been provided for sealing the oil within the dash-pot cylinder. However, so far as I am aware, all such oil spillage preventing means have been of a character which required removing the balance case or enclosing housing to gain access to the dash-pot, a procedure which was time-consuming and frequently required special tools which were not readily available.

The primary object of the present invention is to provide a weighing scale or balance provided with a dash-pot using hydraulic fluid as the damping medium and having means accessible from the exterior of the balance case or enclosing housing for sealing the hydraulic fluid within the dash-pot cylinder during shipment of the balance or when making repairs thereto. A further object of the invention is to provide dash-pot cylinder sealing means which are operable from the exterior of the balance housing without the aid of any tools. A still further object is to generally improve the construction of a dash-pot for a scale or the like and the mounting of the dash-pot so that the plunger will at all times move coaxially with the cylinder during oscillation of the balance beam.

The foregoing and other objects of the invention not specifically enumerated, and the invention in its general aspects, will be better understood from the detailed description which follows, when considered in connection with the accompanying drawings, wherein:

Figure 1 is a front elevation of a balance or weighing scale operating on the torsion principle and embodying the present invention, part of the balance casing and cover being broken away to better illustrate constructional details.

Fig. 2 is a side elevation view of the weighing scale, the casing and cover being removed.

Fig. 3 is an enlarged diametrical section through the dash-pot and specifically illustrating the means for sealing the cylinder to prevent spillage of oil therefrom during shipment and repair.

Referring to the drawings, the invention, by way of illustration, is shown as applied to a weighing scale or balance operating on the torsion principle, the essential parts of which are a base 10 provided with a foot 11 and a pair of leveling screws 12, a substantially centrally disposed truss 13 rigidly mounted on the base and having a torsion spring 14 encircling the truss, a pair of balance arms 15 constituting the balance beam secured to the top and bottom of said torsion spring, said arms adjacent their opposite ends being secured to torsion springs 14a mounted upon floating trusses similar to the truss 13, and balance pans 16 supported by the floating trusses in a manner well known in the art. For dampening the oscillations of the balance beam, which will oscillate about the torsion spring 14 when unequal weights are applied to the balance pans, a dash-pot 17 is connected with one or each of the end trusses of the balance. For arresting and releasing the end trusses suitable arresting means 18 are provided, said arresting means being operable by a rod 19 provided with a knurled finger piece 19a in a conventional manner.

The dash-pot 17 consists essentially of a cylinder 20 and a plunger 21, said plunger comprising a piston 22 of any preferred type, for example, one having openings 23 therethrough, and a piston rod 24 secured at its inner end to the piston by a pair of lock nuts 25 or equivalent means, and at its opposite end being flattened, as shown at 26, and held within the bifurcated end 27 of a bent rod 28, the opposite end of said rod being fixedly secured to an end truss by a pair of lock nuts 29 or equivalent means. The cylinder 20 at its upper end is open and is partially closed by a cap 30 having an external, screw-threaded tubular extension 31 through which the piston rod 24 is freely movable, and at its lower end is closed and formed with a screw-threaded extension 32 terminating in a milled, finger-engageable end 33. The screw-threaded extension 32 is threaded through a screw-threaded opening 34 in the top of the base 10. Fixedly carried by the piston rod 24 adjacent its flattened end 26 is a cup 35 having a diameter to freely pass over the cylinder cap 30, said cup having an internal screw-threaded extension 36 in the base of which is mounted a packing gasket 37 adapted to form a seal with the outer end of the tubular extension 31 when the latter is threaded home into the extension 36, such threading home being accomplished by manual rotation of the screw-threaded extension 32 on the cylinder 20.

A housing such as 38 engages over the base 10 and encloses the beam, the dash-pot and their associated parts for protecting the same against the entrance of dirt and foreign matter. If desirable, a cover 39 may be hingedly connected to the housing to normally protect the balance pans 16 when the balance is not in use.

The scale or balance in use, is substantially the same as the conventional prescription scale and primarily differs therefrom in the specific character and mounting of the dash-pot which is adapted to contain a quantity of hydraulic fluid such as oil or the like. To prevent spillage of the oil from the dash-pot during shipment of the scale or when the scale is to be turned on its side for inspection or repair, the screw-threaded extension 32 is first manually rotated to elevate the cylinder 20 until the top of the extension 31 thereof engages and provides a seal with the packing 37 in the extension 36 of the cup 35. When the scale is to be readied for use after unpacking or after repair, it is set upright, the screw-threaded extension 32 is rotated in the opposite direction until the base of the cylinder 20 firmly seats against the top of the base 10. It will thus be seen that by a simple manipulation of the screw-threaded extension 32 from the exterior of the housing enclosing the scale, spillage of oil from the dash-pot can be prevented in a quick and facile manner.

Although I have shown and described the invention as applied to a weighing scale or balance operating on the torsion principle, it will be understood that the concept underlying the present invention may be applied to a hydraulically operable dash-pot associated with any movable member which is enclosed within a housing. Hence, while I have shown and described a single application of invention, it is to be understood that changes in the detailed construction and arrangement of parts thereof may be made within the range of mechanical and engineering skill without departing from the spirit of my invention as herein claimed.

What I claim is:

In a balance, scale or the like, a fixed base, an oscillatable member movable relatively to said base, a dashpot for damping the oscillations of the movable member, a housing engaging over the base and enclosing the oscillatable member and the dashpot, said dashpot comprising a cylinder formed with an opening in one end and a plunger extending in said opening, said plunger being carried by the movable member, means fixedly mounted on the plunger for sealing the opening in the cylinder through which the plunger operates, the cylinder having a screw-threaded part on the end opposite to that formed with the opening, said cylinder being mounted on the base, and the base having a screw-threaded opening therethrough within and through which the screw-threaded part on the cylinder engages and projects, the projecting part providing a finger-manipulating portion whereby the cylinder may be moved axially relatively to the plunger from the exterior of the housing to cause the sealing means on the plunger to seal the opening in the cylinder.

JOHN FRANK PEZDIC.

REFERENCES CITED

The following references are of record in the file of this patent:

UNITED STATES PATENTS

| Number | Name | Date |
|---|---|---|
| 837,496 | Osborne | Mar. 4, 1906 |
| 923,530 | Jaenichen | June 1, 1909 |
| 1,128,041 | Pritchard | Feb. 9, 1915 |
| 1,220,180 | Bunkholder | Mar. 27, 1917 |